United States Patent
Nagar et al.

(10) Patent No.: US 12,361,179 B2
(45) Date of Patent: Jul. 15, 2025

(54) AUTHORIZATION MANAGEMENT OF MULTIPARTY COMMUNICATIONS

(71) Applicant: International Business Machines Corporation, Armonk, NY (US)

(72) Inventors: Raghuveer Prasad Nagar, Kota (IN); Sarbajit K. Rakshit, Kolkata (IN); Jagadesh Ramaswamy Hulugundi, Bangalore (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 17/807,626

(22) Filed: Jun. 17, 2022

(65) Prior Publication Data

US 2023/0409761 A1    Dec. 21, 2023

(51) Int. Cl.
G06F 21/44 (2013.01)
G06F 21/84 (2013.01)
G10L 21/0272 (2013.01)

(52) U.S. Cl.
CPC .............. G06F 21/84 (2013.01); G06F 21/44 (2013.01); G10L 21/0272 (2013.01)

(58) Field of Classification Search
None
See application file for complete search history.

(56) References Cited

U.S. PATENT DOCUMENTS

| | | | |
|---|---|---|---|
| 10,332,517 B1 * | 6/2019 | Wang | G10L 15/22 |
| 2018/0190297 A1 * | 7/2018 | Waltermann | G10L 17/22 |
| 2019/0012445 A1 * | 1/2019 | Lesso | G10L 17/24 |
| 2019/0243957 A1 | 8/2019 | Fadell | |
| 2020/0134026 A1 | 4/2020 | Lovitt | |
| 2021/0034192 A1 * | 2/2021 | Dumont | G06V 40/176 |
| 2021/0105358 A1 * | 4/2021 | Jolly | G10L 25/60 |
| 2021/0110819 A1 * | 4/2021 | Lakshminarayana | G06Q 20/02 |
| 2022/0103951 A1 * | 3/2022 | Stamenovic | G10L 21/0208 |

(Continued)

FOREIGN PATENT DOCUMENTS

WO    2018198310 A1    11/2018

OTHER PUBLICATIONS

Bradbury, Danny, "Could EarEcho change the way we authenticate our phones?", Sophos, Naked Security, Sep. 23, 2019, 4 pages, <https://nakedsecurity.sophos.com/2019/09/23/could-earecho-change-the-way-we-authenticate-to-our-smartphones/>.

(Continued)

Primary Examiner — Joseph P Hirl
Assistant Examiner — Hassan Saadoun
(74) Attorney, Agent, or Firm — Stephen R. Yoder

(57) ABSTRACT

A processor may receive user data associated with a voice conversation having one or more participating users. The processor may analyze the user data for voice content associated with the voice conversation and the one or more participating users. The processor may determine a security policy associated with the voice conversation. The processor may identify one or more permission rules from the security policy associated with the voice conversation. The processor may dynamically execute the one or more permission rules to a portion of the voice content associated with at least one participating user. Dynamically executing the one or more permission rules may include modifying the portion of the voice content.

17 Claims, 5 Drawing Sheets

(56) References Cited

U.S. PATENT DOCUMENTS

2023/0208663 A1\* 6/2023 Jovanovic .............. H04N 7/147
   709/204
2023/0351003 A1\* 11/2023 Springer .............. H04L 65/403

OTHER PUBLICATIONS

Disclosed Anonymously, "AI-Assisted System to Continuously Verify the Validity of a Caller Using Ear Canal Authentication", An IP.com Prior Art Database Technical Disclosure, IP.com No. IPCOM000264952D, IP.com Electronic Publication Date: Feb. 10, 2021, 6 pages.

Mahto, et al., "Ear Acoustic Biometrics Using Inaudible Signals and Its Application to Continuous User Authentication", 2018 26th European Signal Processing Conference (EUSIPCO), 2018, pp. 1421-1425, <https://new.eurasip.org/Proceedings/Eusipco/Eusipco2018/papers/1570437448.pdf>.

Mell, et al., "The NIST Definition of Cloud Computing", National Institute of Standards and Technology, Special Publication 800-145, Sep. 2011, 7 pages.

Ziv, D. Daniel, "Doing More With Real-Time Speech Analytics: A Showcase", Analytics India Magazine, Apr. 29, 2018, 4 pages, <https://analyticsindiamag.com/doing-more-with-real-time-speech-analytics-a-showcase/>.

"Biometric authentication based on the acoustic characteristics of the ears", Research &Development, Mar. 1, 2018, 03 pages, https://www.nec.com/en/global/rd/technologies/earrecognition/index.html.

"Ear Acoustic Authentication Technology: Using Sound to Identify the Distinctive Shape of the Ear Canal", NEC Technical Journal, vol. 13, 2018, 11 pages, https://www.nec.com/en/global/techrep/journal/g18/n02/180219.html.

"NEC develops biometrics technology that uses sound to distinguish individually unique ear cavity shape", Mar. 7, 2016, 03 pages, https://www.nec.com/en/press/201603/global_20160307_01.html.

BBC News, "Headphones use ear canals to carry out ID checks", Mar. 9, 2016, 07 pages, https://www.bbc.com/news/technology-35766069.

Mathur Vishal, "Human ears to become the next authentication factor", Mar. 9, 2016, 14 pages, https://www.livemint.com/Leisure/inNkNvYUPoCOpN6C2rL4MJ/Human-ears-to-become-the-next-authentication-factor.html.

\* cited by examiner

AUTHORIZATION MANAGEMENT OF MULTIPARTY COMMUNICATIONS

BACKGROUND

Aspects of the present disclosure relate generally to the field of artificial intelligence, and more particularly to authentication technology.

Authentication technology using biometrics (biological information), such as fingerprints, allow people to perform authentication protocols using their biological attributes. Authentication technology that utilizes biometrics often have a decreased risk of an unauthorized user gaining access to an authorized user's data. In addition, due to the biological aspect of the biometrics, such attributes are less likely to be lost or forgotten than a traditional password.

SUMMARY

Embodiments of the present disclosure include a method, computer program product, and system for optimizing object disassembling.

A processor may receive user data associated with a voice conversation having one or more participating users. The processor may analyze the user data for voice content associated with the voice conversation and the one or more participating users. The processor may determine a security policy associated with the voice conversation. The processor may identify one or more permission rules from the security policy associated with the voice conversation. The processor may dynamically execute the one or more permission rules to a portion of the voice content associated with at least one participating user. Dynamically executing the one or more permission rules may include modifying the portion of the voice content.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
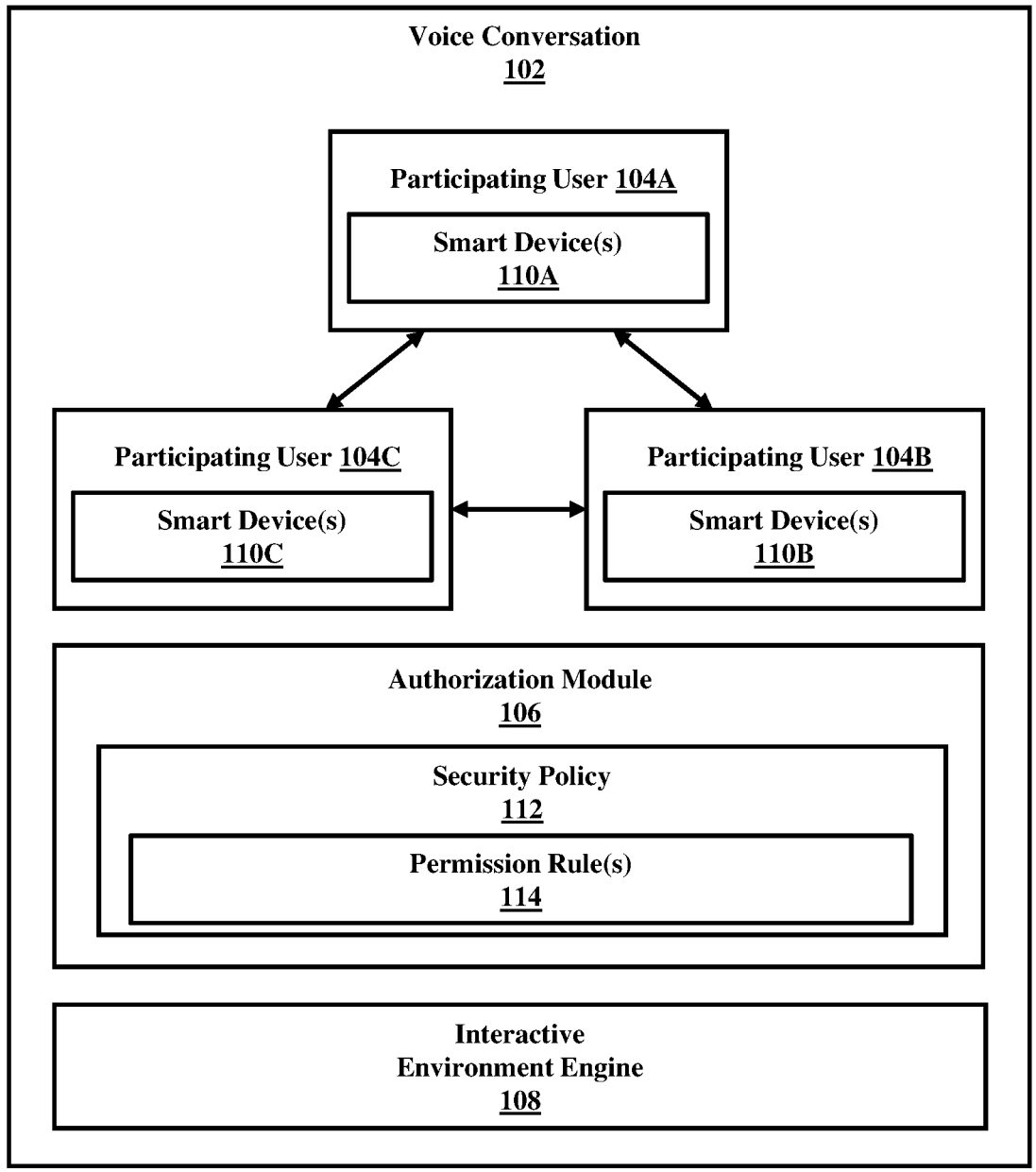
FIG. 1 illustrates a block diagram of an example voice management system, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence, and, more particularly, to authentication technology. While the present disclosure is not necessarily limited to such applications, various aspects of the disclosure may be appreciated through a discussion of various examples using this context.

During multiparty voice collaboration, one or more participants may not have the authorization to listen to some of the specific spoken content. To maintain confidentiality in such situations, a participant must choose to speak with one or more persons selectively, at different times. For example, in a university department meeting, a participating user may only be authorized to listen to an update on their project, and unauthorized to listen to other participating users' project. This may result in increased time and a loss in productivity. As such, there is a desire for a solution for multiparty voice conversations where participating users are authenticated in real-time by monitoring specific spoken/speech content and visual analysis of participating users. Embodiments contemplated herein perform the speech delivery authorization by simultaneously listening (e.g., analyzing) to the content of the voice collaboration and applying the security rules that may apply to the content of the multi-party voice collaborations. Based on the security rules, a portion of content may be relayed to some participating users (e.g., those participating users who are authorized) and not others.

Before turning to the FIGS. it is noted that the benefits/novelties and intricacies of the proposed solution are that:

While performing any multi-party spoken conversation (e.g., voice conversation), the voice management system may configure a paired interactive environment (e.g., augmented reality (AR) and/or virtual reality (VR) environment) for selectively defining spoken content permission among the participants of the conversation (e.g., via head-mounted display or smart contact lens). The voice management system may then apply a security policy on the voice conversation of the one or more participating users. In another embodiment, the interactive environment may recognize each of the one or more participating users using various analyses. These analyses may be performed using device camera or an integrated IoT (Internet of Things) server of the smart environment (e.g., IoT-enabled smart environment). These analyses may be used to determine the various permissions/authorizations. In some embodiments, the voice management system may apply the permissions/authorizations automatically. For example, before discussing any particular topic, a participating user may select User A, User B and User C to listen a particular portion of voice content. In this example, the other users (e.g., User D and User E) will not be able to listen to those particular portions of voice contents while the authorized users (e.g., User A, User B and User C) will be able to listen to the portion of voice content. In another example, when a conversation starts, the interactive environment may identify that the participating user is talking to User A, User B and User C by biometric recognition techniques. In this example, the voice management system may then detect that User A, User B and User C are co-workers and, as such, a particular participating User A's personal information conveyed to User C should not be disclosed to User B.

A participating user may also define authentication based on voice context of the voice conversation. For example, authentication may be made based, at least in part, on a participating user's speech patterns (e.g., whispering, accents, pitch, etc.). The voice management system may contextually analyze participating users' spoken content and apply an appropriate security policy (e.g., one or more permission rules) will be applied on at least the portion of voice content of the voice conversation. For example, if a participating user wants to discuss any personal or private information, then the selected (e.g., authenticated) participating users can listen to the spoken content, the other participating users (e.g., unauthorized) may be configured to not receive that personal or private information.

During a multi-party voice conversation, voice management system may configure an interactive environment (e.g., AR or VR environment systems) that enables a participating user to selectively define one or more group for cross talking within the voice conversation. In these embodiments, voice management system can configure the voice conversation to enable a particular participating user to partake in crosstalk with another participating user while the multi-party voice conversation is in progress with all of the participating users. In some embodiments, the voice management system may configure the interactive environment to allow the one or more participating users to visualize a translated text of main conversation (e.g., voice content) in interactive environment. In one example where ten friends are discussing a particular topic, voice management system may separate the one or more participating users into two groups (e.g., one or more groups). These groups may include the main conversation where all of the participating users are participants (e.g., contributing and/or listening) and a crosstalk group where a subset of the participating users are able to discuss voice content that is not included in the main conversation. In these embodiments, voice management system may configure for the captions of one or more of the voice content associated with these groups to be displayed in the interactive environment. Continuing the above example, voice management system may display a caption of the voice content shared in the main conversation group in the interactive environment.

The voice management system may be configured to include hearing and microphone devices (e.g., audio devices), such as earbuds. These audio devices may be configured to include one or more smart devices with ear canal-based authentication. In such embodiments, the proposed voice management system may use this information (e.g., user data) to continuously validate the user's authentication or authorization. As a result, each participating user will only be able to hear the portions of voice content associated with the voice conversation that is authorized (e.g., based on the security policy) and no portion of voice content that is not authorized.

The voice management system may be configured to identify paired devices (e.g., associated with the interactive environment(s)). Once a paired device is identified and security policies have been applied (e.g., to analyze voice content), voice management system may collect personal information a participating user has opted in to providing. For example, an individual participating user's personal information (e.g., accent, fluent languages, desired narration speed) may be stored by voice management system. In one example embodiment, voice management system may automatically translate a portion of a voice component to a text version of a particular user's fluent language within the interactive environment.

Voice management system may be configured to identify one or more undesirable audio (e.g., sounds or noise) components from the voice conversation. For example, if voice content of a participating user includes noises such as sneeze, cough, sniffling, etc. such undesirable audio components (e.g., portions of voice content) may subtracted or removed from the broadcasted audio. What is considered an undesirable audio component may be defined in the security policy by one or more permission rules. This ensures the undesirable audio component is not heard by other participating users as these may cause distress to various participating users and are generally considered irrelevant to the voice conversation.

Voice management system may be configured to receive and use user profiles associated with one or more participating users. Voice management system may base the use of these user profiles on one or more permission rules associated with the security policy. In one example embodiment where a family with parents and children are watching a movie with earbuds, voice management system may determine a word in the movie is unsuitable word for a particular age group. In this example embodiment, voice management system may configure the voice content of the voice conversation associated with the movie is modified to ensure that while the adults may hear an unmodified voice conversation, the voice content broadcast to the children will not include the unsuitable word. In some embodiments, voice management system may be configured to utilize both earbuds (e.g., having the ear-canal based authorization) and interactive environment devices (e.g., AR glasses) to share authorization information as needed.

Referring now to FIG. 1, illustrated is a block diagram of an example robotic assembly system 100 for optimizing object disassembly, in accordance with aspects of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

As depicted in FIG. 1, voice management system 100 may be configured to include voice conversation 102 having one or more participating users (e.g., participating user 104A, participating user 104B, and participating user 104C), authorization module 106, and interactive environment engine 108. Voice conversation 102 may refer to any instance where one or more participating users are participating in an exchange of audio. For example, a voice conversation may take place among participating users, participating user 104A, participating user 104B, and participating user 104C as depicted in FIG. 1 where audio is exchanged among the participating users. While FIG. 1 depicts three separate participating users, such a configuration is intended for example only and should not be inferred as limiting.

In embodiments, each participating user may have one or more smart devices (e.g., smart devices 110A, smart devices 110B, smart devices 110C for respective participating users participating user 104A, participating user 104B, and participating user 104C). Smart devices may include, but are not limited to devices such as, Internet of Things (IoT) devices, cameras, infrared sensors, ultrasounds, chemical sensors, speakers, wearable devices (e.g., earbuds), microphones or any combination thereof. In some embodiments, a smart device, such as an earbud, may be further configured with additional smart devices (e.g., in addition to conventional speaker and microphones), such as sensors for identifying biometric attributes (e.g., ear canal attributes, vocal attributes, etc.).

In some embodiments, voice management system 100 may be configured to receive/collect user data associated with voice conversation 102 (e.g., using one or more smart devices and/or one or more data collection devices). In some embodiments, voice management system 100 may configure one or more smart devices (e.g., smart devices 110A, smart devices 110B, smart devices 110C) to collect user data associated with voice conversation 102 and/or each of the one or more participating users (e.g., users participating user 104A, participating user 104B, and participating user 104C). User data may include, but is not limited to, information or data associated with: i) the configuration of voice conversation 102 (e.g., is each of the participating users in a different location); ii) the type and number of smart devices used by each participating user to participate in voice conversation 102; iii) information associated with voice content (e.g., voice management system 100's determined understanding of the audio associated with each of the participating users); iv) data/information collected in real-time associated with voice conversation 102 (e.g., to allow for dynamic execution of the one or more permission rules); v) information/data generated from various analyses contemplated herein (e.g., information/data generated by AI and machine learning analysis via authentication module 106); vi) information/data associated with unique biometric components (e.g., ear canal attributes, vocal attributes, etc.); vii) information/data associated with security policy 112 and the one or more permission rules 114 associated determining what participating users may have authorized/permission access to particular portions of voice content associated with voice conversation 102; viii) information/data collected over a period of time, stored in a historical repository; and ix) information associated with interactive environments (e.g., AR and/or VR environments), such as interactive environment 108.

In embodiments, voice management system 100 may be configured to store user data collected over time in a historical repository. The historical repository may include any user data contemplated herein. In embodiments, voice management system 100 may access the historical repository to authorize/authenticate one or more participating users using AI and machine learning capabilities (e.g., authentication module 106). The information generated from these analyses may be considered user data and may also be stored within the historical repository.

In embodiments, voice management system 100 may analyze user data for voice content using authentication module 106. Voice content may be associated with one or more participating user of voice conversation 102 and may include the words and understanding of the audio of the voice conversation 102. While in some embodiments, authentication module 106 may be configured within a smart device, such as an earbud, in other embodiments, authentication module 106 may be configured independently of authentication module 106. Authentication module 106 may be configured to use natural language understanding (NLU) to predict voice content. By using speech to text conversion techniques (e.g., syntax and semantic analysis techniques), authentication module 106 may be able to "understand" and determine voice content (e.g., understand what is being spoken in voice conversation 102). Authorization module 106 may be configured to use artificial intelligence (AI) and machine learning technology to perform the various analyses contemplated herein. Authentication module 106 may be further configured to use supervised learning (e.g., permission rule input to the system), unsupervised learning including real-time internet search (e.g., participating user asking eh speaker not to disclose the particular portion of voice content), and/or reinforcement learning (e.g., rewarding or penalizing based on feedback from a conversation organizer or participating users). In some embodiments, authorization module 106 may be configured to use deep learning techniques (e.g., K-mean clustering and/or R-CNN based analyses) to authenticate a participating user (e.g., using biometric components unique to each participating user). In some embodiments, authentication module 106 may be configured to perform ensemble modelling (e.g., random forest modelling) to identify voice content and if the voice content deviates from the predicted topics.

In some embodiments, voice management system 100 may configure authorization module 106 to generate a knowledge corpus to predict if any voice content should be authorized/authenticated prior to the voice content being broadcast to each of the one or more participating parties (e.g., based at least in part on security policy 112). In one example embodiment, authentication module 106 may use historical learning techniques to analyze and determine various aspects of voice conversation 102 such as, the agenda topics, diversion pattern of content during discussion (e.g., topic diversion resulting from extended discussion, cross questions and/or number of participating users), participating user information (e.g., if a particular participating user diverts from the agenda topic), and participating user specific attributes (e.g., ear canal attributes, vocal attributes, etc.).

In some embodiments, authorization module 106 may analyze user data (e.g., historical user data) and predict voice content. In such embodiments, authorization module 106 may predict what voice content may have any content which may require a level of authorization/authentication for one or more participating users. The level of authorization/authentication for one or more of the participating users regarding voice content may be based, at least in part on security policy 112. Security policy 112 may include one or more permission rules 114 that ensure a participating user only has access to voice content they are authorized to receive. Each of the one or more permission rules 114 may include a rule or regulation that should be applied to the voice conversation and the identified voice content.

In embodiments, voice management system 100 may determine if a security policy 112 (e.g., a permission rule 114) is associated with voice conversation 102 using authorization module 106. A permission rule 114 may include, but is not limited to, how a participating user should be authorized/authenticated, what voice content should be accessible to what participating user, regulations associated with how an interactive environment (e.g., generated via interactive environment engine 108) should be configured, identifying whether groups having a subset of participating users are allowed (e.g., groups that allow for cross talk between fewer than all the participating users), and, if groups are allowed, rules regarding how those groups should be configured. Security policy 112 and/or permission rules 114 may be defined by a particular participating user (e.g., leader of the meeting) associated with voice conversation 102 or an administrator. In some embodiments, authorization module 106 may use AI and machine learning techniques to derive security policy 112 and/or permission rules 114. For example, authorization module 106 may analyze user data (e.g., a participating user's calendar) to know the meeting subject and agenda. In some embodiments, security policy 112 and/or permission rules 114 may be based on contextual senses of the topic such as personal information associated with a particular participating user and classified/confidential information associated with voice content. In some embodiments, security policy 112 and/or permission rules 114 may be based on knowledge sharing that is publicly available or voice pattern-based rules (e.g., normal voice volume versus whispering).

In some embodiments, authorization module 106 may store security policy 112 and/or permission rules 114 in a remote server (e.g., conversation server). By storing security policy 112 and/or permission rules 114 in a conversation based server allows for allows for the security policy 112 to be applied to all participating users associated with voice conversation 102 and enforced centrally instead of using local copies associated with each paired device.

In embodiments, authorization module 106 may identify whether one or more permission rules 114 from a security policy 112 may apply to voice conversation 102. In these embodiments, authorization module may analyze the security policy and the identified voice content associated with voice conversation 102 to determine if a permission rule 114 should be applied to the voice content (e.g., identifying if any particular topic of voice content should be restricted from a particular participating user). In some embodiments, security policy 112 may have a permission rule 114 that allows an authorized participating user to disallow or prevent at least one participating user from accessing (e.g., listening or reading) voice content associated with a particular topic. In some embodiments, an authorized participating user may have a user preference (e.g., associated with a user profile) that disallow or prevent access of the particular topic at any point during voice conversation 102 by change a permission rule 114. In such embodiments, the authorized participating user must be authorized by security policy 112 to enact such a permission rule change. In these embodiments, authorization module 106 may apply the permission rule change (e.g., updated permission rule) to the voice content of voice conversation 102 in real time. As such, the listening party or the participating user who is listening will be analyzed using the permission rule change to determine if the listening participating user is authorized to access/listen to the particular voice content or if the authorized user should be prevented from accessing/listening to the voice content.

In embodiments, voice management system 100 may dynamically execute the one or more permission rules to a portion of the voice content associated with at least one participating user. Dynamically executing the one or more permission rules may include modifying the portion of the voice content. In embodiments where voice management system 100 modifies the one or more permission rules, voice management system 100 may analyze user data and the voice conversation in real-time. Voice management system 100 may identify, responsive to analyzing the user data and voice conversation, an undesirable audio component (e.g., sneeze, cough, etc.). In these embodiments, voice management system 100 may simultaneously subtract an undesirable audio component from the voice content and broadcasting the voice content. In such embodiments, subtracting the undesirable voice component from the voice content removes the undesirable voice component from the voice content during broadcasting. In embodiments where voice management system 100 modifies the one or more permission rules, voice management system 100 may authorize a portion of the voice content to be broadcast to the one or more participating users of the voice conversation.

In embodiments, voice management system 100 may be configured to generate an interactive environment associated with one or more participating users of voice conversation 102. Interactive environment may be configured using interactive environment engine 108. Interactive environment engine 108 may generate an AR or VR environment where the one or more participating users may interact with other participating users while participating in voice conversation 102.

In embodiments, voice management system 100 may analyze security policy 112 associated with voice conversation 102 to determine if any of the one or more permission rules 114 may relate to the interactive environment. In some embodiments, based on the one or more permission rules 114, a subset of the one or more participating users may be formed into one or more groups. In these embodiments, a first group of the one or more groups may have a different set of permissions than a second group of the one or more groups. In one example embodiment where all of the participating users associated with voice conversation 102 are in a first group (e.g., participating user 104A, participating user 104B, and participating user 104C), a subset of the participating users (e.g., participating user 104A, participating user 104B) may be selected from the total number of participating users (e.g., first group) to form a second group. In these embodiments, participating users in the second group can communicate voice content that is not available to participating users in the first group. In these embodiments, participating users in the second group may simultaneously have access to voice content associated with the first group and the second group. Such embodiments may be use when a subset of the participating users desire to perform crosstalk or exchange voice content that only a subset of the participating users are authorized to have access to. In some embodiments, a participating user can dynamically move from the crosstalk group to a main discussion group by performing one or more motions in the interactive environment.

In some embodiments, voice content exchanged in voice conversation 102 may be converted to text and displayed in the interactive environment. For example, converted text may be displayed in on an AR device (e.g., AR glasses). In some embodiments, interactive environment and the associated devices a participating user may use to interact with the interactive environment may be with an earbud device (e.g., an AR/VR headset configured with an earbud listening device). These interactive environment devices may be configured by security policy 112 to determine how each participating user may interact or visualize other participating users. In some embodiments, participating users may enable or disable one or more of the permission rules 114 of security policy 112 based on how the participating user interact with the interactive environment. This change (e.g., enablement or disablement of the permission rules 112 may be synced with the conversation server.

In some embodiments, authorization module 106 may be configured to analyze user data associated with each of the one or more participating users to identify ear canal based attributes and/or vocal attributes associated with each of the one or more participating users. In these embodiments, authorization module 106 may receive this user data from the one or more smart devices associated with each participating user. Ear canal based attributes and vocal attributes or other biological parameters may be utilized to confirm a participating user's identity during the authorization process. In embodiments, these biological parameters (e.g., ear canal based attributes, vocal attributes, etc.) may be used to identify unique biometric components that may be used to properly authorize a participating user. In some embodiments, authorization module 106 may combine ear canal based attributes and the vocal attributes associated with a particular participating user to form a unique biometric component that may be used to authorize the participating user. In some embodiments, this authorization process using biometric components may be based on the one or more permission rules. In some embodiments, authorization module 106 may continuously perform the biometric component authentication of each of the participating users.

Figure 2:
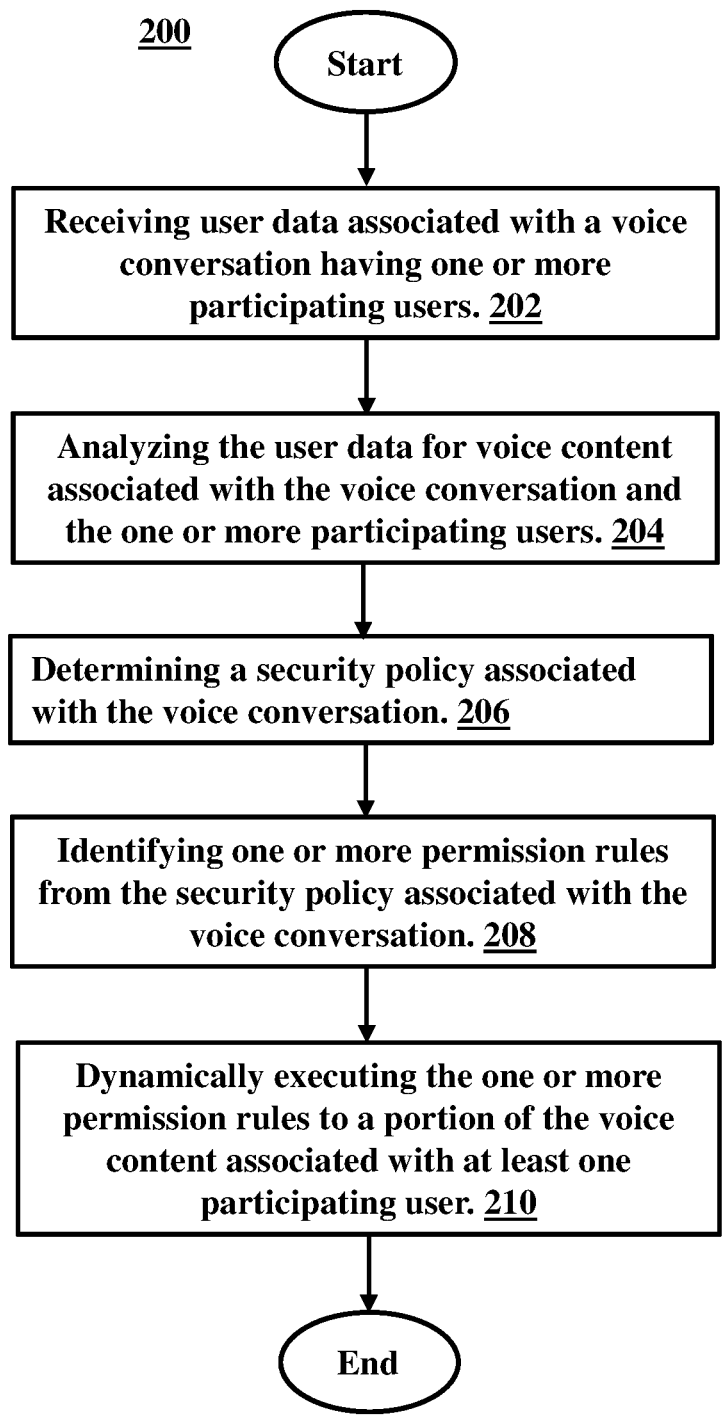
FIG. 2 illustrates a flowchart of an example method for managing a voice conversation, in accordance with aspects of the present disclosure.

Referring now to FIG. 2, a flowchart illustrating an example method 200 for managing a voice conversation, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive user data associated with a voice conversation having one or more participating users. In some embodiments, the method 200 proceeds to operation 204.

At operation 204, a processor may analyze the user data for voice content associated with the voice conversation and the one or more participating users. In some embodiments, the method 200 proceeds to operation 206.

At operation 206, a processor may determine a security policy associated with the voice conversation. In some embodiments, the method 200 may proceed to operation 208.

At operation 208, a processor may identify one or more permission rules from the security policy associated with the voice conversation. In some embodiments, the method 200 may proceed to operation 210.

At operation 210, the processor may dynamically execute the one or more permission rules to a portion of the voice content associated with at least one participating user. In some embodiments, dynamically executing the one or more permission rules may include modifying the portion of the voice content. In some embodiments, as depicted in FIG. 2, after operation 208, the method 200 may end.

In some embodiments, discussed below there are one or more operations of the method 200 not depicted for the sake of brevity and which are discussed throughout this disclosure. Accordingly, in some embodiments, the processor may.

In embodiments where the portion of the voice content is modified, the processor may authorize the portion of the voice content to be broadcast to the one or more participating users of the voice conversation.

In some embodiments, the processor may generate an interactive environment associated with the one or more participating users of the voice conversation. In these embodiments, the processor may analyze the security policy associated with the voice conversation. The processor may then select a subset of the one or more participating users into one or more groups. In some embodiments, a first group of the one or more groups may have a different set of permissions than a second group of the one or more groups.

In embodiments, the processor may analyze user data associated with each of the one or more participating users. The processor may then identify ear canal based attributes from the user data associated with each of the one or more participating users. In these embodiments, the processor may then authorize, based on the one or more permission rules, at least one participating user using the ear canal based attributes.

In some embodiments, the one or more permission rules may include a set of user preferences.

In embodiments where a portion of the voice content is modified, the processor may analyze the user data and the voice conversation in real-time. The processor may then identify, responsive to analyzing the user data and voice conversation, an undesirable audio component. In these embodiments, the processor may simultaneously subtract the undesirable audio component from the voice content and broadcast the voice content. In some embodiments, subtracting the undesirable voice component from the voice content may remove the undesirable voice component from the voice content during broadcasting.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
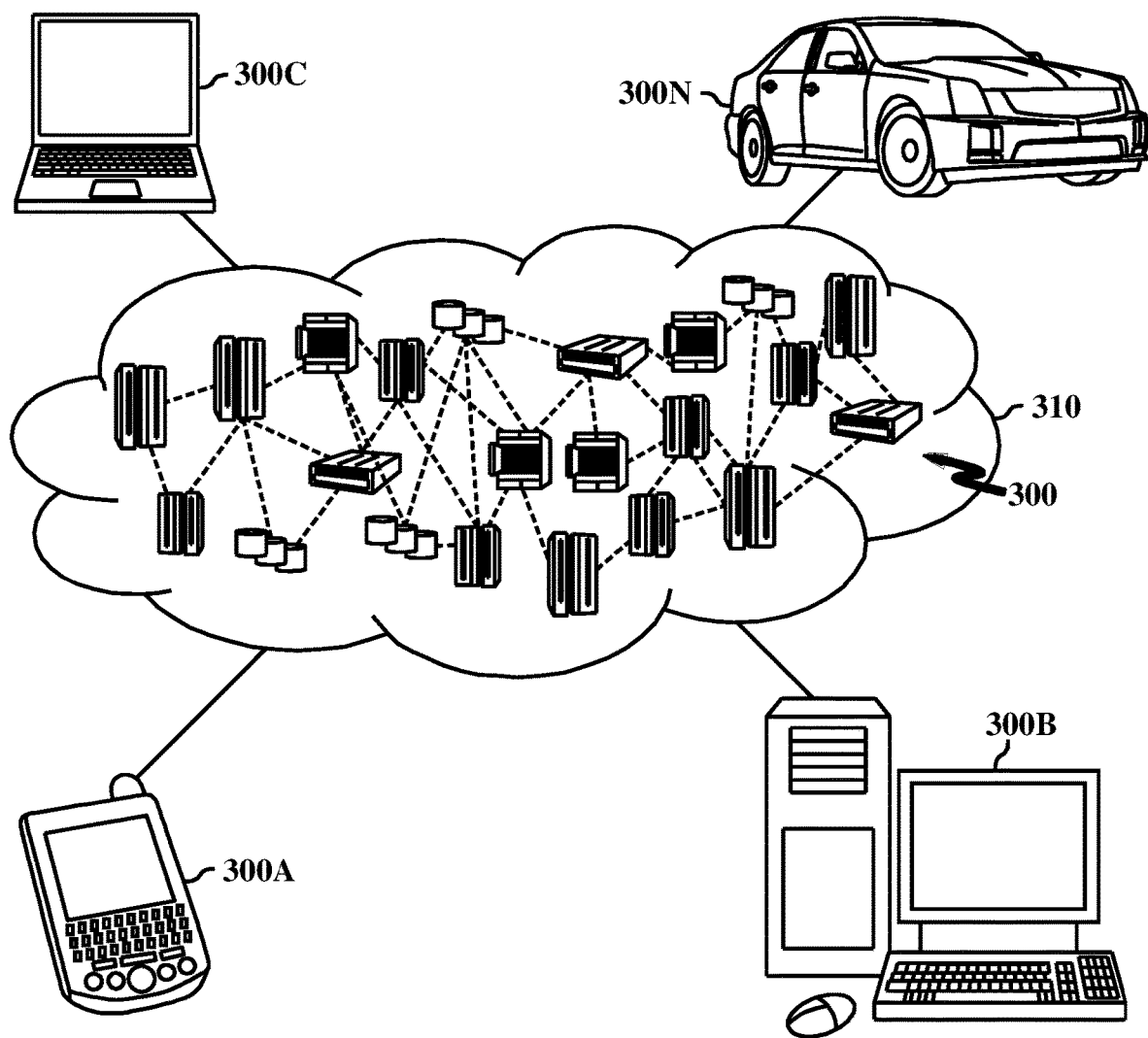
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
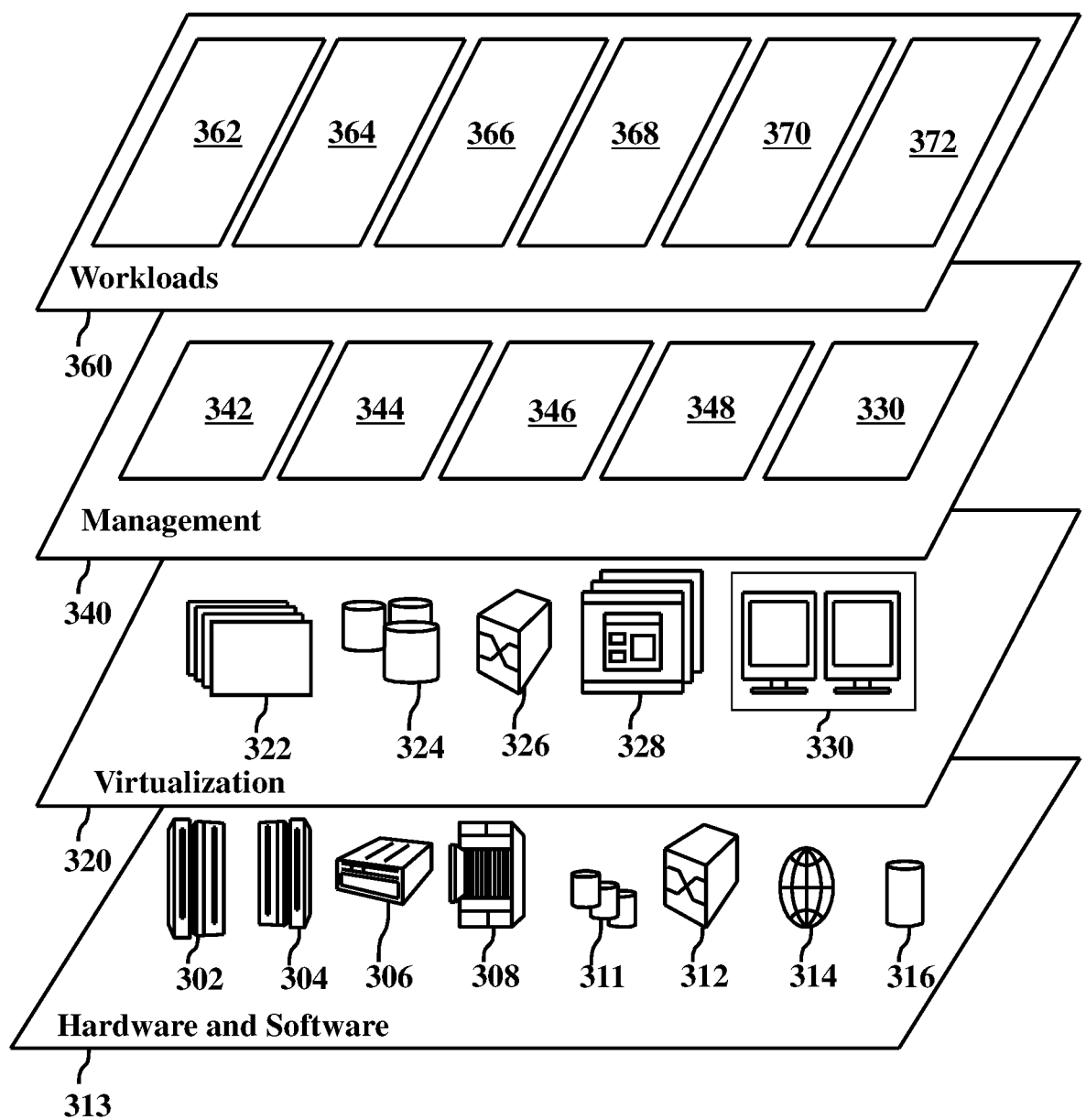
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and voice managing 372.

Figure 4:
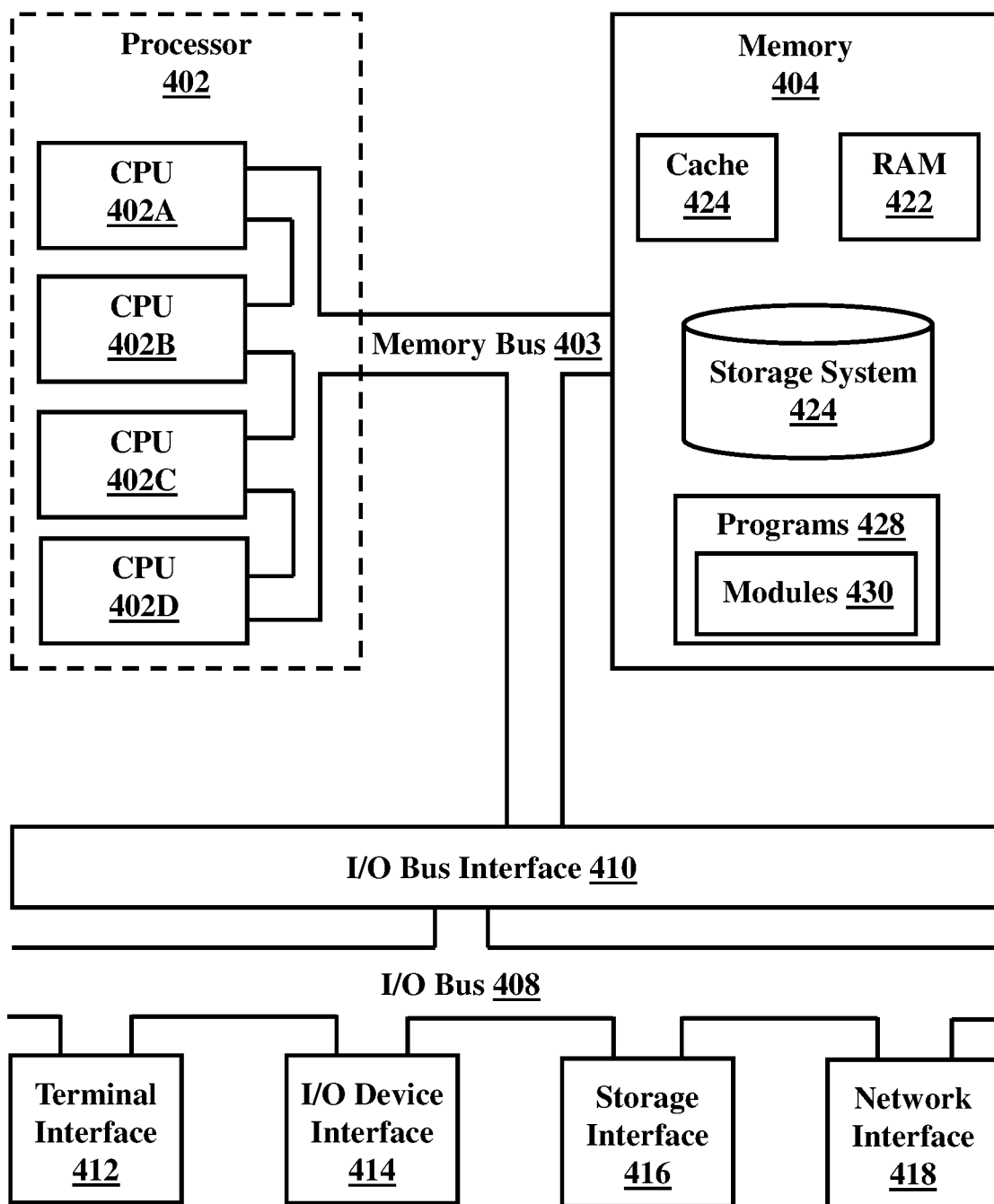
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for managing a voice conversation, the method comprising:
   receiving a set of user data associated with a voice conversation having one or more participating users;
   analyzing the set of user data for voice content associated with the voice conversation and the one or more participating users;
   determining, from the voice content, a security policy selectively defining spoken content permissions among the one or more participating users; and
   dynamically executing one or more permission rules of the security policy to remove a portion of the voice content while broadcasting the voice conversation to an unauthorized participating user.

2. The method of claim 1, wherein modifying removing the portion of the voice content includes:
   authorizing the portion of the voice content to be broadcast to an authorized participating user of the voice conversation.

3. The method of claim 1, further comprising:
   generating an interactive environment associated with the one or more participating users of the voice conversation;
   analyzing the security policy associated with the voice conversation; and
   selecting subsets of the one or more participating users into groups, a first group having a different set of permissions than a second group.

4. The method of claim 1, further comprising:
   analyzing individual user data of the set of user data, the individual user data associated with a first participating user;
   identifying ear canal attributes from the individual user data; and authorizing the first participating user based on the ear canal attributes.

5. The method of claim 1, wherein the one or more permission rules includes a set of user preferences.

6. The method of claim 1, further comprising:
analyzing individual user data of the set of user data, the individual user data associated with a first participating user;
identifying ear canal attributes and vocal attributes from the individual user data;
combining the ear canal attributes and the vocal attributes to form a unique biometric component associated with the first participating user; and
authorizing the first participating user based on the unique biometric component.

7. A system, the system comprising:
a memory; and
a processor in communication with the memory, the processor being configured to perform operations comprising:
receiving a set of user data associated with a voice conversation having one or more participating users;
analyzing the set of user data for voice content associated with the voice conversation and the one or more participating users;
determining, from the voice content, a security policy selectively defining spoken content permissions among the one or more participating users; and
dynamically executing one or more permission rules of the security policy to remove a portion of the voice content while broadcasting the voice conversation to an unauthorized participating user.

8. The system of claim 7, wherein removing the portion of the voice content includes:
authorizing the portion of the voice content to be broadcast to an authorized participating user of the voice conversation.

9. The system of claim 7, further comprising:
generating an interactive environment associated with the one or more participating users of the voice conversation;
analyzing the security policy associated with the voice conversation; and
selecting subsets of the one or more participating users into groups, a first group having a different set of permissions than a second group.

10. The system of claim 7, further comprising:
analyzing individual user data of the set of user data, the individual user data associated with a first participating user;
identifying ear canal attributes from the individual user data; and
authorizing the first participating user based on the ear canal attributes.

11. The system of claim 7, wherein the one or more permission rules includes a set of user preferences.

12. The system of claim 7, further comprising:
analyzing individual user data of the set of user data, the individual user data associated with a first participating user;
identifying ear canal attributes and vocal attributes from the individual user data;
combining the ear canal attributes and the vocal attributes to form a unique biometric component associated with the first participating user; and
authorizing the first participating user based on the unique biometric component.

13. A computer-implemented method for managing a voice conversation, the method comprising:
receiving user data associated with a voice conversation including a plurality of participants;
analyzing the user data for voice context associated with the voice conversation and the plurality of participants;
determining, from the voice context, a security policy selectively defining spoken content permissions according to individual authorizations of the plurality of participants; and
dynamically executing a set of permission rules of the security policy to remove a portion of the voice content for transmission to unauthorized participants while broadcasting the portion of voice content to authorized participants.

14. The computer-implemented method of claim 13, further comprising:
generating an interactive environment associated with the plurality of participants;
analyzing the security policy associated with the voice conversation; and
selecting subsets of the participants to participate in respectively corresponding groups, wherein a first group has a different set of permissions than a second group.

15. The computer-implemented method of claim 13, further comprising:
analyzing individual portions of the user data, the individual portions associated with individual participants, including a first participant;
identifying ear canal based attributes of the first participant from the individual portions of the user data; and
authorizing, based on the set of permission rules, the first participant using the ear canal based attributes.

16. The computer-implemented method of claim 13, further comprising:
analyzing individual portions of the user data, the individual portions associated with individual participants, including a first participant;
identifying ear canal based attributes and vocal attributes of the first participant from individual portions of the user data;
combining the ear canal based attributes and the vocal attributes to form a unique biometric component associated with the first participant; and
authorizing, based on the set of permission rules, the first participant using the unique biometric component.

17. The computer-implemented method of claim 13, further comprising:
authorizing the authorized participants based on the voice context.

* * * * *